Patented May 30, 1933

1,911,411

UNITED STATES PATENT OFFICE

JAN AUGUSTO VILJOEN, OF MADISON, WISCONSIN, ASSIGNOR TO C. F. BURGESS LABORATORIES, INC., OF MADISON, WISCONSIN A CORPORATION OF DELAWARE

FERMENTATION OF SUGARS

No Drawing. Application filed June 11, 1929. Serial No. 370,146.

This invention relates to improvements in the fermentation of sugars for the production of acetone and alcohols, particularly butyl alcohol. The invention enables high yields of butyl alcohol and acetone to be obtained from concentrated sugar solutions, and especially from cane or beet molasses in the form of concentrated solution. This is a continuation in part of my co-pending application Serial No. 290,877, filed July 6, 1928.

It is possible to ferment to completion very dilute molasses solutions containing less than about 3% of sugar and produce therefrom butyl alcohol and acetone by inoculating such dilute solutions with a small volume of a corn-meal starter solution; but the dilution of the molasses solution greatly increases the evaporation cost in recovering the volatile end products, counterbalancing the saving in cost of raw material. The excessive dilution of such molasses solutions makes the process uneconomical to operate in competition with the fermentation of maize, because of various losses and the high evaporating and concentrating costs.

The present invention provides an improved method by which it is possible to ferment solutions of high sugar content with high yields of volatile solvents and with the production of fermented solutions comparable in content of solvents with solutions heretofore produced by the fermentation of corn, so that the amount of evaporation required per pound of solvent recovered is no greater than and is usually less than that in the case of corn fermentation.

I have discovered that by adding a comparatively large number of bacilli to a properly buffered strong sugar solution, it becomes possible to ferment a large percentage of the sugars to butyl alcohol, acetone and ethyl alcohol which are in the ratio to about 5 to 2½ to 1. I have discovered that for an increasing sugar content of the final mash, the number of bacilli must increase per unit of sugar present. I term this action of the bacilli when present in large number "bacterial mass attack," meaning thereby that an excessive number of bacilli is present as compared with ordinary methods of fermentation, and that the fermentation takes place in strong sugar solutions for the production of butyl alcohol, etc.

This discovery is the more surprising since concentrated solutions of molasses are difficult to ferment. For example, if a water solution of 10% of blackstrap molasses containing sufficient buffer nitrogen is inoculated with a small number of bacilli, for example, with a vigorously fermenting 3% cornmeal solution in the ratio of 10 parts of starter to 100 parts of mash, the fermentation, if conducted at the proper temperature, usually from 30 to 35° C. proceeds vigorously for a limited period of time and then stops before any considerable amount of butyl alcohol or other solvents are formed, and the solution has a sour smell due to the accumulation of acids therein. The resulting solution still contains a large per cent. of original unfermented sugar snowing that the bacilli failed to function, due to plasmolysis or other causes.

When, however, such a large excess of bacilli is added that bacterial mass attack is obtained, the fermentation goes practically to completion even when the solution to which the bacilli are added is a concentrated sugar solution. The addition of a large number of bacilli lowers the concentration of the solution, and the action of the bacilli will further lower the concentration of sugar within a short time. Under such conditions effective action of the bacilli in fermenting the solution is not prevented by plasmolysis or other causes.

The source of the carbohydrate fermented in the present process is one of the cheaper sources of sugar. Blackstrap molasses is available in large amounts and at low cost and is well suited for use in the present process. The molasses may be either from cane sugar or beet sugar production. Raw sugar juices from other sources, or sugars from other sources can be employed, such as the fructose made from the inulin of dahlia bulbs, or sugars from the hydrolysis of cellulose. The different raw materials require in some cases a slightly altered procedure, but in general the method is not fundamentally altered.

The sugar solutions or suspensions fermented in the present process are solutions of high concentration, comparable with or higher than the carbohydrate content of corn or maize solutions or suspensions heretofore commonly fermented. Solutions containing from 8 to 13% or higher of blackstrap molasses in the final composite fermenting solutions can be fermented. The percentage of sugar in blackstrap molasses may vary from e.g. 40 to 60%, but is assumed to be an average of about 50% sugars, so that the final composite fermenting solution is one equivalent to a sugar content of around 4 to 6½% or higher of sugars. By my process I may secure yields of alcohols and acetone of 30 to 33% of the total sugars present and around 33 to 36% of the sugars fermented. I consider a fermentation effective if there results a high yield of solvents of at least 25% of the total sugars present and at least 28% of the sugars fermented. Usually there is left unfermented a concentration of not more than about ½ lb. of sugar per 100 lbs. of final mash. It is well known to those skilled in the art that molasses contains a small amount of unfermentable sugar such as glucose. In an effective fermentation practically all of the fermentable sugar is changed into solvents, carbon dioxide and hydrogen.

In carrying out the present process, it is important to have nitrogen compounds of suitable character present in regulated amounts in the fermenting solutions. The bacteria must have nitrogen and various salts to live and multiply. In the case of maize, this nitrogen is present in the material to be fermented. Blackstrap molasses does not contain enough nitrogen to supply that needed for the organisms themselves and for buffer nitrogen. In general, the fermenting bacilli cannot live in a medium having a high hydrogen ion concentration, although they can withstand considerable amounts of undissociated acids. I have found it important to carry out the fermentation within a narrow range of hydrogen ion concentration, the pH value usually being between 4.4 to 4.8. Such a regulated pH is important for successful fermentation.

During the butyl alcohol fermentation, acids are formed. If these acids are allowed to accumulate, the hydrogen ion concentration becomes too high and the solution becomes toxic to the bacilli. In some acid fermentations, calcium carbonate is added to the fermenting solution to neutralize the acids formed. This is done, for example, in the acetic acid fermentation, calcium acetate being formed. This cannot be done, however, in the butyl fermentation because calcium butyrate would be formed and this cannot be changed by the bacilli to butyl alcohol.

In the present process, the acid formation which may not be neutralized by calcium carbonate is taken care of by the addition of buffer nitrogen in regulated amounts. By buffer nitrogen, I mean nitrogen groups having a basic reaction and which unite with and neutralize the free acids formed during the fermentation. It is important that nitrogen compounds having such basic groups be present in sufficient amount to neutralize the acids as formed, and to form therewith compounds which are then broken down by the organisms to form the butyl alcohol and acetone and release more of the amino base to neutralize more of the acids formed. The process is thus more or less cyclic in character.

Most protein materials, and especially the vegetable proteins, are excellent sources of buffer nitrogen. The fermenting organism or bacilli, which I will refer to as "*Clostridium acetobutylicum*," is proteolytic in character and can break down the proteins to form compounds having amino groups which unite with and neutralize the acids formed. The name "*Clostridium acetobutylicum*" employed in the specification and claims, is not intended to designate any single organism, but is used to identify the group of related organisms having the properties set forth above and which are capable of fermenting fermentable solutions to produce butyl alcohol and acetone. Although proteins, and especially vegatable proteins are suitable as sources of buffer nitrogen, it requires the proteolytic action of the bacilli to change them into the proper form.

I have found it important, when fermenting strong sugar solutions, to add the proteins to the final mash in such form that they unite readily with the butyric and acetic acids formed. This condition can readily be obtained by subjecting the proteins to the action of the bacilli in an operation preliminary to the final fermentation. I find it an advantage to have the proteins present in the starter solution where they will be acted upon and be proteolized by the organisms and form buffer nitrogen compounds before being added to the sugar solution. A starter solution containing corn meal may comprise sufficient protein of itself. Where a solution deficient in protein material, such as a dilute sugar solution, is employed as the starter solution, I add protein or protein-like material to it. After the starter is mixed with the strong sugar or molasses mash to form the final mash, these buffer nitrogen compounds neutralize the acids as fast as they are formed during the final fermentation by means of the basic nitrogen group of the proteolyzed proteins, forming butyrates and acetates. These butyrates and acetates are then broken down by the organisms to form the butyl alcohol and acetone, thus releasing more of the amino base to neutralize more acids subsequently formed, thereby making the process more or less cyclic in character.

The starter solution, therefore, although it may be a dilute sugar solution, does not allow the accumulation of an excessive amount of acids but permits the proteolytic reaction to proceed to the fullest extent and form the necessary amino bases which neutralize the large amount of acids formed in the concentrated sugar solution of the final fermenting mash.

This addition of buffer nitrogen in regulated amounts to the strong final sugar solution mash to form the final mash for the fermentation is one of the important features of the process. Not only should a sufficient amount of buffer nitrogen be present, but care should be taken not to introduce too much buffer nitrogen into the mash since excessive amounts result in a decrease of yields and in the rate of fermentation.

I have found that linseed or soya bean meal, after the oil has been expressed or extracted, is especially suitable as a source of protein for producing buffer nitrogen. Such protein is added to the starter solution which is deficient in buffer nitrogen-forming compounds in amount sufficient to bring the content of proteolyzed protein or buffer nitrogen in the final fermenting solution or mash up to the proper amount. In the starter the ratio of protein to carbohydrate is similar to that in corn mashes, but in the final fermenting solution or mash a much lower ratio of protein to carbohydrate is present.

The invention will be illustrated further by the following more detailed examples, but it is intended and will be understood that the invention is not limited thereto.

According to one method of carrying out the invention, a maize solution is employed as the starter. It is possible to secure a vigorous growth of *Clostridium acetobutylicum* in a maize suspension and add a large volume of the fermenting maize to the concentrated sugar-containing solution, and thereby obtain the necessary bacterial mass attack to ferment the sugars. As an example, 400 parts by volume of a 3% corn-meal suspension is inoculated and allowed to ferment at 30 to 38° C. until the bacilli are at or near their maximum concentration. This takes about 24 to 30 hours after inoculation if grown at 32° C. At higher temperatures the time is decreased, being about 9 hours at 37° C. This starter suspension is then mixed with about 400 parts by volume of a sterile solution of 20% of cane or beet molasses (10% of sugars). In this case the corn-meal starter contains sufficient proteolyzed protein (being present in the corn) or buffer nitrogen for the final fermentation which is carried out at a temperature of about 30 to 38° C. At 32° C. the fermentation of certain types of molasses is complete in from 6 to 9 days and at 37° C. in from 3 to 5 days.

The strength of the corn-meal starter suspension may be varied, usually being between 2 and 5%. Suspensions of corn-meal employed for fermenting are frequently referred to as "solutions" in the art.

By using a starter made from some sugar solution such as molasses instead of a corn-meal suspension, the cost of the process may be materially reduced. In addition the use of a molasses starter apparently greatly increases the speed of fermentation so that the time is decreased, e. g., nearly 50%, from that required when the corn-meal starter is used.

A suitable starter may be prepared by inoculating a dilute molasses solution containing less than 3% of sugars after adding sufficient buffer nitrogen for the final fermentation, with a small volume of a corn-meal starter. As an example, 10 parts by volume of an actively fermenting 3% suspension of maize may be added to 100 parts by volume of a sterilized solution of water containing 4% of blackstrap molasses, or about 2% of sugars, which may be increased to 3% under favorable conditions. Since the molasses in the strong added mash is lacking in buffer nitrogen, sufficient proteolizable nitrogen, such as peptone, corn gluten, linseed meal or soya-bean meal must be added to the starter to obtain a high yield of butyl alcohol or other volatile solvents. About 15%, expressed as proteins, of the sugar present in the starter, is sufficient.

In using such a starter solution or suspension it is added to the strong sugar or molasses mash at an active state of fermentation. It is allowed to ferment until the maximum population of bacilli is reached, usually after 9 to 30 hours at 38° to 30° C. before adding it to the strong sugar or molasses mash to form the final mash. If it is desired to ferment a final concentration of 10% of molasses or 5% of sugars, an equal volume of the starter containing buffer nitrogen is then mixed with a sterile mash containing 16% of molasses or 8% of sugars. It is important that the mixing of the starter and mash be done at the proper stage of the physiological life cycle of the organism.

If it is desirable to ferment a final concentration of 12% of molasses or 6% of sugars, 600 parts by volume of the starter containing buffer nitrogen are mixed with 200 parts by volume of a sterile mash containing 36% of molasses or 18% of sugars.

The following is a specific example of the above method for fermenting Cuban, Louisiana or beet molasses. The parts are by volume.

One part of old seed mash containing dormant spores of *Clostridium acetobutylicum* are added to 10 parts of an 8% sterile corn-meal mash. This inoculated mash is heated to 80° C. for about 3 minutes, cooled rapidly and allowed to ferment at 32° to 38° C. The fermentation proceeds until the corn-meal heads the mash, usually in 36 to 14 hours. At this stage the bacilli are at or near their maximum concentration. The mash (about 10 parts) is added to 100 parts of a sterile 3% corn-meal suspension which ferments at about 37° C. for about 20 hours or until the bacilli are at or near their maximum concentration. This actively fermenting seed (about 100 parts) is added to a sterile starter mash consisting of 1000 parts of a 4% molasses (about 2% sugars) solution and 6 parts by weight of well dried, oil-free soya-bean meal (about 50% protein content). This starter ferments for about 9 hours at 37° C. or until the bacilli are at or near their maximum concentration. Instead of soya-bean meal I may use 7 parts by weight of linseed meal per 1000 parts by weight of 4% molasses.

The starter produced as above described is then mixed with about an equal volume of about 1,000 parts of a sterile mash of 16% molasses (about 8% sugars) solution. The fermentation then goes to completion at about 37° C. Instead of mixing the starter and strong molasses mash at one time I prefer to add the strong molasses mash to the starter slowly over a period of several hours as will be explained hereinafter. With certain beet and blackstrap molasses the fermentation is completed in 48 to 60 hours and with another type of blackstrap molasses it is completed in about 72 hours.

The solvents are then distilled from the fermented mash in the usual way well known to those skilled in the art.

The volumes given in the above example are approximate only because it is difficult to control them accurately because of evaporation, condensation and fermentation volume changes. The times given for the various operations also may vary considerably over those given.

In the preceding example, the corn-meal seed culture is removed but one step from the final mash. Instead of adding the molasses or a sugar starter, produced as above described, to the strong sugar or molasses mash, I have found that the starter may be added to another 4% molasses and buffer nitrogen mash in the volume ratio of about 1 to 10 as with the first starter mash. When this second 4% molasses reaches or approximates its maximum growth of organism, it is mixed with the strong molasses mash to form the final mash in the necessary proportions to secure bacterial mass attack. This method introduces but a negligible amount of corn-meal into the final fermenting mash.

Instead of mixing all of the starter with the strong sugar mash to produce the final mash at one time, I have obtained better results by adding gradually the strong molasses to the starter. By this method I have been able in this way to cut down the entire time of fermentation very materially, for example, by as much as 24 hours; and I have also been able to ferment a final mash giving a final concentration of 11.5% molasses or nearly 6% of sugar.

The following example further illustrates this process: 4540 parts by volume of 4% Cuban molasses containing oil-free soya-bean meal amounting to about 0.75% of the weight of the starter, are inoculated with 460 parts by volume of 3% corn-meal culture (prepared at 37° C.) about 20 hours old, as inoculum. After allowing the starter to ferment, 5,000 parts by volume of sterile 19.27% Cuban molasses are added gradually to the starter. The rate of adding the molasses depends upon the temperature, a slower rate being necessary at lower temperatures, and a higher rate being possible at higher temperatures. If the fermentation temperature is maintained at 37° C. the molasses solution is added at such a rate that all of it is added during about 24 hours. The fermentation is then usually complete 24 hours after all of the molasses has been added. If a fermentation temperature of 32° C. is employed the molasses is added during about 36 hours and the fermentation is complete 36 hours after the molasses has been added.

The number of bacteria which it is necessary to add to secure the necessary bacterial mass attack increases much more rapidly than the concentration of sugar. With still stronger concentrations of sugars, the conversion to butyl alcohol and acetone apparently drops, due to the presence of the large quantities of these solvents which apparently affect the bacilli.

The fermentation should be carried out at a temperature of about 30 to 38° C., 37° C. being a favorable one. The lower temperatures cause a slowing down of the fermentation while too high temperatures are fatal. The fermentation may go to completion in from 48 to 168 hours depending upon the conditions of the process. For instance, certain types of beet molasses and Louisiana blackstrap molasses ferment more rapidly than certain types of Cuban blackstrap molasses.

In carrying out the process, the starter employed should contain as high a percentage of sugar as is practical in order to provide the highest concentration of bacilli, less osmotic change in mixing the two solutions, more fermentation of sugar in the starter with less to ferment in the final mash, thereby shortening the time, and to insure the effectiveness of the organism during the mixing and final fermentation. When the strong sugar mash is added gradually to the starter to form the final mash this sudden osmotic change is avoided. If too little sugar is present in the starting solution, there is a danger of the organism becoming inactive before the mixing is done. Proteolysis is also proportional to the amount of sugar present and too little sugar causes a lack in proteolyzed protein or buffer nitrogen.

In calculating the amount of protein to be added to the starter solution or suspension to form proteolyzed protein or buffer nitrogen, the amount of protein in maize, which varies from 9 to 10 per cent., is taken as a standard in comparison to the starch therein. These same proportions of protein to carbohydrate which are normally present in maize, the natural habitat of the organism, appear to be the best proportions when other carbohydrates and other sources of buffer nitrogen are employed in the starter solution or suspension. For each 100 parts by weight of cane sugar, there are therefore required about 12 to 15 parts by weight of protein such as that from linseed meal or soya-bean meal. However, this range may be extended as I have obtained excellent results when as high as 20 parts of protein were used with 100 parts of sugar.

When the protein employed is one which in its natural condition contains oil, it is important that the oil should be removed almost completely or practically so before the protein is employed in the process. Corn does not contain enough oil to interfere with the fermentation. To avoid the objectionable effect of oil, the protein material employed should be free or practically so from oil containing not more than about ½% or less. Although the oil in corn as such is not sufficient to interfere with the fermentation, when corn gluten is employed as a source of buffer nitrogen, it should not contain more than about ½% of oil. When the oil has been extracted from the gluten high in oil, it forms a satisfactory source of buffer nitrogen.

It is possible also to use a proteolizable protein-like nitrogenous compound of animal origin such as a water soluble nitrogenous product made by hydrolyzing packing house refuse such as horn, hide, hair, hoof, ligaments, tendons and similar material, as a source of buffer nitrogen. As an example the following procedure was used successfully with such solution containing about 50% of protein-like nitrogenous compound. 51 cc. of a 3% sterile corn-meal mash containing 2.9 grams of the above 50% solution were inoculated with 9 cc. of a 24-hour culture of *Clostridium acetobutylicum* in corn-meal. This culture, after fermenting for 24 hours at 32° C., was added to 540 cc. of a sterile 4% molasses solution. The starter thus prepared was mixed after fermenting 24 hours at 32° C., with 200 cc. of a sterile 29.2% molasses mash, to give a final mash equivalent of 10% molasses. The fermentations were effective and were complete after 4½ to 5½ days.

Although I have described molasses fermentations in which the starters have been either corn-meal solutions or sugar solutions, such as are made from molasses, and which contain a limited amount of corn as inoculum, nevertheless it is possible to employ starters which may be mixtures of both corn-meal and molasses in whatever ratios may be found desirable. It will be necessary, of course, to add sufficient buffer-forming nitrogen compounds to such mixed starters so that the final mash is buffered properly.

I have also discovered that it is necessary to heat molasses and sugar solutions at the proper temperature and for the correct length of time during the sterilizing process or the fermentations are not effective. I have found that the molasses solutions must be cooked carefully so as not to cause changes in the sugars or other constituents to form toxic materials. These toxic materials are formed apparently by heat and are due possibly to caramelization of the sugar. I do not know the exact nature of the change. Boiling for 20 to 30 minutes at atmospheric pressure causes sufficient sterility for the fermentation. Although the dilute molasses may be boiled for two hours at atmospheric pressure without appreciable harmful effect, it is not advisable to boil it longer than this time. At 15 lbs. steam pressure about one hour is the maximum time the sugar mash may be kept at this boiling pressure without harmful results. With higher steam pressures the time is shortened in proportion to the increase in temperature. The mash should be heated to and cooled from the sterilizing temperature as rapidly as possible as long heating and cooling periods also cause detrimental effects. The injection of live steam under high pressure into the mash also seems to be detrimental apparently because of local overheating of the mash. The best methods for heating seem to be by coils or jacketed kettles. A method which gives excellent results is to first bring the diluting water for the heavy as-received molasses to a boil in any convenient way and then boil with steam jacket or any other indirect way while the heavy molasses is added.

It will be understood further that all fermentations, including starters, are made with mashes suitably sterilized, as previously described. Where the per cent. of sugar is specified, the sugar is expressed in terms of glucose as is usually done in the art, and the amount stated is the amount originally used in the starter mash and/or the strong sugar or molasses mash and/or the final mash.

I claim:

1. The process for producing a high yield of alcohols and acetone from molasses deficient in nitrogen by fermentation with *Clostridium acetobutylicum* which comprises preparing a sterile starter mash from molasses comprising about 2 percent of sugars and sufficient proteolyzable protein to make up for the nitrogen deficiency in the final fermentation, inoculating said starter mash with said bacilli, allowing said starter mash to ferment until said bacilli are at or near their highest possible concentration per unit of volume, preparing a second sterile mash of said molasses containing at least 8 percent of sugars, combining said second mash with at least an equal volume of said vigorously fermenting starter mash to make a final mash, the combined content of sugar in the starter mash before inoculation and the second sterile mash being not less than 5%, and allowing the combined mashes to ferment vigorously to produce a high yield of alcohols and acetone.

2. The process for producing a high yield of alcohols and acetone from sugars deficient in nitrogen for fermentation with *Clostridium acetobutylicum* which comprises preparing a sterile starter mash comprising about a 2 percent solution of sugars and sufficient suitable protein to make up for the nitrogen deficiency in the final fermentation, inoculating said starter mash with said bacilli, allowing said starter mash to ferment until said bacilli are at or near their highest possible concentration per unit of volume, preparing a second sterile mash of said sugars containings at least 8 percent of sugar, combining said second mash with at least an equal volume of said vigorously fermenting starter mash to make a final mash, the combined content of sugar in the starter mash before inoculation and the second sterile mash being not less than 5%, and allowing the combined mashes to ferment vigorously to produce a high yield of alcohols and acetone.

3. The process for producing a high yield of alcohols and acetone from sugars deficient in nitrogen by fermentation with *Clostridium acetobutylicum* which comprises preparing a sterile starter mash comprising a solution of said sugars sufficiently dilute to promote vigorous fermentation to produce a high yield of alcohol and solvents when inoculated with a relatively small number of said bacilli and sufficient suitable nitrogenous material to make up for the nitrogen deficiency in the final fermentation, inoculating said starter mash with said bacilli, allowing said starter mash to ferment until said bacilli are at or near their highest possible concentration per unit of volume, preparing a second mash of said sugars in such concentration that the combined original sugar content of said starter mash and said second mash would be sufficient to prevent effective fermentation if inoculated with a vigorously fermenting 3 percent corn meal solution in the ratio of 10 parts of starter to 100 parts of said solution, combining said second mash with at least an equal volume of said vigorously fermenting starter mash to produce a final mash and allowing the combined mashes to ferment vigorously to produce a high yield of alcohols and acetone.

4. The process for producing a high yield of alcohols and acetone from sugars deficient in nitrogen by fermentation with *Clostridium acetobutylicum* which comprises preparing a sterile starter mash comprising a solution of said sugars sufficiently dilute to promote vigorous fermentation to produce a high yield of alcohols and acetone when inoculated with a relatively small number of said bacilli, and sufficient suitable nitrogenous material to make up for said nitrogen deficiency in the final fermentation, inoculating said starter mash with said bacilli, allowing said starter mash to ferment until said bacilli are at or near their highest possible concentration per unit of volume, preparing a second mash of said sugars in such concentration that the combined original sugar content of said starter mash and said second mash would be sufficient to prevent effective fermentation if inoculated by a relatively small number of said bacilli, combining said second mash with at least an equal volume of said vigorously fermenting starter mash to form a final mash, and allowing the combined mashes to ferment vigorously to produce a high yield of alcohols and acetone.

5. The process for producing a high yield of alcohols and acetone from molasses deficient in nitrogen by fermentation with *Clostridium acetobutylicum* which comprises preparing a sterile molasses starter mash containing less than 3 percent of sugars and buffer forming and available nitrogen forming protein approximating that in an equivalent amount of corn meal, inoculating said starter mash with said bacilli, allowing said starter mash to ferment until said bacilli are at or near their highest possible concentration per unit of volume, preparing a second mash of said molasses, combining said second mash with enough of said vigorously fermenting starter mash to secure bacterial mass attack and produce a final mash, the combined original sugar content of said starter mash and said second mash being about 5% or more and allowing the combined mashes to ferment to produce a high yield of alcohols and acetone.

6. The process for producing a high yield of alcohols and acetone from molasses deficient in nitrogen by fermentation with *Clostridium acetobutylicum* which comprises preparing a sterile starter mash containing substantially 3 percent of corn meal, inoculating said starter mash with said bacilli, allowing said starter mash to ferment until said bacilli are at or near their highest possible concentration per unit of volume, preparing a second sterile mash of said molasses containing at least 10 percent of sugars, combining said second mash with at least an equal volume of said vigorously fermenting starter mash to make a final mash the combined original sugar content of said starter mash and said second mash being not less than 5 percent and allowing the combined mashes to ferment vigorously to produce a high yield of alcohols and acetone.

7. The process for producing a high yield of alcohols and acetone from sugars deficient in nitrogen by fermentation with *Clostridium acetobutylicum* which comprises preparing a sterile starter mash comprising from 2 to 5 percent of corn meal, inoculating said starter mash with said bacilli, allowing said starter mash to ferment until said bacilli are at or near their highest possible concentration per unit of volume, preparing a second sterile mash of said sugars containing at least 10 percent of said sugars, combining said second mash with enough of said vigorous starter mash to secure effective fermentation of said combined mashes, the original content of said starter mash and said mash being sufficient to prevent effective fermentation if inoculated by a relatively small number of said bacilli, and allowing the combined mashes to ferment to produce a high yield of alcohols and acetone.

8. The step in the method for producing a vigorous effective alcohol and acetone fermentation by *Clostridium acetobutylicum* of a sugar solution strong enough to prevent effective fermentation by said bacillus if added in small number, which comprises adding a sufficient number of said bacilli to said solution in the presence of buffer nitrogen to cause bacterial mass attack and bring about effective fermentation thereof.

9. The step in the method for producing a vigorous effective alcohol and acetone fermentation by *Clostridium acetobutylicum* of a molasses solution strong enough in sugars to prevent effective fermentation by said bacillus if added in small number, which comprises adding a sufficient number of said bacilli to said solution in the presence of buffer nitrogen to cause bacterial mass attack and bring about effective fermentation thereof.

10. The step in the method for producing a vigorous effective alcohol and acetone fermentation by *Clostridium acetobutylicum* of a sugar solution containing at least 5 percent of sugars which comprises adding a sufficient number of said bacilli to said solution in the presence of buffer nitrogen to cause bacterial mass attack.

11. The step in the method for producing a vigorous effective alcohol and acetone fermentation by *Clostridium acetobutylicum* of a molasses solution containing at least 5 percent of sugars which comprises adding a sufficient number of said bacilli to said solution in the presence of buffer nitrogen to cause bacterial mass attack.

12. The process for producing an effective fermentation to produce a high yield of alcohols and acetone in the fermentation by *Clostridium acetobutylicum* of a sugar final mash composed of material having an original sugar content which would prevent effective fermentation by said bacilli if added in small number, which comprises having a sufficient number of said bacilli present in said sugar final mash to cause bacterial mass attack and allowing said fermentation to proceed in the presence of a sufficient amount of added nitrogen to prevent the accumulation of a lethal concentration of organic acids and produce a yield of solvents of at least 25 percent of the total sugars present.

13. The process for producing an effective fermentation to produce a high yield of alcohols and acetone in the fermentation by *Clostridium acetobutylicum* of a molasses final mash composed of material having an original sugar content which would prevent effective fermentation by said bacilli if added in small number, which comprises having a sufficient number of said bacilli present in said molasses final mash to cause bacterial mass attack, and allowing said fermentation to proceed in the presence of a sufficient amount of added proteolyzed protein to prevent the accumulation of a lethal concentration of organic acids and produce a yield of solvents of at least 25 percent of the total sugars present.

14. The method for preventing the formation of a lethal concentration of organic acids in the fermentation by *Clostridium acetobutylicum* of a sugar final mash composed of material having an original sugar content which would prevent effective fermentation by said bacilli if added in small number, which comprises having present in said sugar final mash a sufficient amount of proteolyzed protein to neutralize said organic acids formed during fermentation.

15. The method of preventing the formation of a lethal concentration of organic acids and obtaining a high yield of alcohols and acetone in the fermentation by *Clostridium acetobutylicum* of a strong molasses final mash which comprises having present in said molasses final mash a sufficient amount of proteolyzed protein to neutralize said organic acids formed during fermentation, and keeping the pH value between 4.4 and 4.8.

16. The method of fermenting with *Clostridium acetobutylicum* strong molasses solutions containing a high enough concentration of sugars to prevent effective fermentation by said bacillus if present in small amount and deficient in nitrogen, which comprises inoculating with said bacillus a sterile starter mash comprising a solution of said molasses less in sugar concentration than will prevent effective fermentation by said bacillus if added in small number and containing a protein capable of being acted upon by said bacillus to provide available nitrogen and form buffer nitrogen in an amount about equal to that in an equivalent corn meal solution, allowing said mash to ferment until said bacilli approach or are at their highest concentration, employing the resulting actively fermenting mash as the starter to combine with a strong molasses mash to form the molasses final mash, the combined original sugar content of said starter and second mashes being equivalent to said strong molasses solution.

17. The method of introducing buffer nitrogen into a strong sugar solution deficient in nitrogen to form a final mash which is to be fermented by *Clostridium acetobutylicum* to produce a high yield of butyl alcohol and acetone which comprises dividing said strong sugar solution into a starter mash and a strong sugar mash, the concentration of the sugar in the final mash based on the combined contents of sugar in the starter mash before inoculation and the strong sugar mash added thereto being high enough to prevent effective fermentation by said bacilli if present in small number, adding a proteolyzable protein to the starter mash to allow said bacilli to simultaneously ferment the carbohydrate in said starter mash and form buffer nitrogen from nitrogenous compounds present, and mixing said strong sugar mash with said starter mash to form said final mash.

18. The method of introducing buffer nitrogen into a strong sugar solution deficient in nitrogen to form a final mash which is to be fermented by *Clostridium acetobutylicum* to produce a high yield of butyl alcohol and acetone which comprises dividing said strong sugar solution into a starter mash and a strong sugar mash, the concentration of the sugar in the final mash based on the combined contents of sugar in the starter mash before inocualtion and the strong sugar mash added thereto being high enough to prevent effective fermentation by said bacilli if present in small number, adding a vegetable protein to the starter mash to allow said bacilli to simultaneously ferment the carbohydrate in said starter mash and form buffer nitrogen from nitrogenous compounds present, and mixing said strong sugar mash with said starter mash to form said final mash.

19. The process for producing a high yield of alcohols and acetone from molasses deficient in nitrogen by fermentation with *Clostridium acetobutylicum* which comprises preparing a sterile starter mash and adding thereto protein which is substantially oil free, the amount of such protein being sufficient to provide the necessary available nitrogen and buffer nitrogen for the final mash, inoculating said starter mash with said bacilli, allowing said starter mash to ferment until said bacilli are at their highest possible concentration per unit of volume, preparing a strong molasses mash, the combined original sugar content of said starter mash and said mash being about 5% or more, combining said second mash with at least an equal volume of said vigorously fermenting starter mash and allowing the combined mashes to ferment vigorously to produce a high yield of alcohols and acetone.

20. The method of introducing nitrogen into a strong sugar solution deficient in nitrogen to form a final mash which is to be fermented by *Clostridium acetobutylicum* to produce a high yield of alcohols and acetone, which comprises dividing said strong sugar solution into a starter mash and a strong sugar mash, the concentration of the sugar in said final mash, based on the combined original sugar content of said strong sugar and starter mashes, being high enough to prevent effective fermentation by said bacillus if present in small number, adding a substantially oil free proteolyzable protein to the starter mash to allow said bacillus to simultaneously ferment the carbohydrate in said starter mash and form available and buffer nitrogen from said protein, and mixing said strong sugar mash with said starter mash.

21. In the process of producing a high yield of alcohols and acetone by the fermentation with *Clostridium acetobutylicum* of a molasses solution, the step of sterilizing the molasses solution, which comprises rapidly heating the solution to the temperature necessary to effect sterilization and then sterilizing and cooling the solution before toxic materials are formed in a quantity sufficient interfere with the fermentation.

22. In the process of producing a high yield of alcohols and acetone by the fermentation with *Clostridium acetobutylicum* of a dilute molasses solution, the step of sterilizing the molasses solution, which comprises bringing the water employed for diluting the molasses to a boil and maintaining the water at a boil while the molasses is added thereto, thereby preventing the formation of toxic materials in an amount sufficient to interfere with the fermentation.

23. The process of producing a high yield of alcohols and acetone from sugars deficient in nitrogen by fermentation with *Clostridium acetobutylicum* which comprises preparing a sterile starter mash containing about 2 percent of said sugars and sufficient suitable protein to make up for said nitrogen deficiency in the final fermentation, inoculating said starter mash with said bacilli, allowing said starter mash to ferment until said bacilli are at or near their highest possible concentration per unit of volume, preparing a second mash of said sugars containing at least 8 percent of sugars, combining said second mash with at least on equal volume of said vigorously fermenting starter mash to make a final mash, the combined content of sugar in the starter mash before inoculation and the second mash being not less than about 5%, and allowing the combined mashes to ferment vigorously to produce a high yield of alcohols and acetone.

24. The process for producing a high yield of alcohols and acetone from molasses deficient in nitrogen by fermentation with *Clostridium acetobutylicum* which comprises preparing a sterile starter mash comprising about 3 percent of corn meal, inoculating said starter mash with said bacilli, allowing said starter mash to ferment until said bacilli are at or near their highest possible concentration per unit of volume, preparing a sterile mash of said molasses containing at least 10 percent of sugars, combining said second mash with at least an equal volume of said vigorously fermenting starter mash to make a final mash the combined original sugar content of the combined mashes being at least about 5%, and allowing the combined mashes to ferment vigorously to produce a high yield of alcohols and acetone.

25. The step in the method of producing a vigorous effective alcohol and acetone fermentation by *Clostridium acetobutylicum* of a sugar final mash composed of a solution with an original sugar content averaging at least 5 percent, which comprises forming a vigorously fermenting starter mash containing less than 5 percent of sugars and protein capable of being acted on by said bacillus to provide available nitrogen and to form buffer nitrogen approximating that present in an equivalent amount of corn meal, and gradually adding thereto a sugar mash of a concentration greater than 5 percent of sugar.

26. The process of producing an effective fermentation to produce a high yield of alcohols and acetone in the fermentation with *Clostridium acetobutylicum* of a sugar final mash composed of a solution originally strong enough in sugars to prevent effective fermentation by said bacilli if added in small number, which comprises gradually adding a strong sugar mash to a starter mash at such a rate as to maintain a sufficient number of said bacilli in the resulting mixture to secure effective fermentation thereof, and allowing said fermentation to proceed in the presence of a sufficient amount of buffer nitrogen to prevent the accumulation of a lethal concentration of organic acids and produce a yield of solvents of at least 25 percent of the total sugars present.

27. The method of preventing the formation of a lethal concentration of organic acids in the fermentation by *Clostridium acetobutylicum* of a sugar final mash composed of a solution originally strong enough in sugars to prevent effective fermentation by said bacilli if added in small number, which comprises adding a strong sugar mash to a starter mash and maintaining in the resulting mixture at all times sufficient added proteolyzed protein to neutralize said organic acids formed during fermentation.

28. The process for producing a high yield of alcohols and acetone from sugars deficient in nitrogen by fermentation with *Clostridium acetobutylicum* which comprises preparing a sterile starter mash comprising about a 2 percent solution of said sugars and sufficient suitable protein to make up for said nitrogen deficiency in the final mash, inoculating said starter mash with said bacilli, allowing said starter mash to ferment until said bacilli are at or near their highest possible concentration per unit of volume, preparing a second sterile mash of said sugars containing at least 8 percent of said sugars, both the starter mash and the second mash being sterilized for such time and at such a temperature that said sterilized sugar mashes will not develop sufficient toxicity to prevent an effective fermentation, combining said second mash with at least an equal volume of said vigorously fermenting starter mash to make the final mash, the combined content of sugar in the starter mash before inoculation and the second sterile mash being not less than about 5%, and allowing the combined mashes to ferment vigorously to produce a high yield of alcohols and acetone.

29. The process for producing a high yield of alcohols and acetone from molasses deficient in nitrogen by fermentation with *Clostridium acetobutylicum* which comprises sterilizing a molasses starter mash containing less than 3 percent of sugars at such a temperature that the said sterilized starter mash will not develop sufficient toxicity to prevent an effective fermentation, adding protein capable of being acted on by said bacillus to provide available nitrogen and to form buffer nitrogen in an amount approximating that in corn meal, inoculating said starter mash with said bacilli, allowing said starter mash to ferment until said bacilli are at or near their highest possible concentration per unit of volume, sterilizing a second mash of molasses of higher sugar content than the starter mash for such time and at such a temperature that the sterilized mash will not develop sufficient toxicity to prevent an effective fermentation, combining said second mash with such amounts of said vigorously fermenting starter mash that effective fermentation thereof is secured, the combined content of sugar in the starter mash before inoculation and the second sterile mash being about 5% or more of sugar, and allowing the combined mashes to ferment vigorously to produce a high yield of alcohols and acetone.

30. The process of producing an effective fermentation to produce a high yield of alcohols and acetone in the fermentation by *Clostridium acetobutylicum* of a strong sugar solution strong enough in sugars to prevent effective fermentation by said bacilli if added in small number, which comprises sterilizing said sugar solution for such a time and at such a temperature that sufficient toxicity will not develop to prevent an effective fermentation, adding a sufficient number of said bacilli to said sterilized sugar solution to cause bacterial mass attack, and allowing said fermentation to proceed in the presence of a sufficient amount of added buffer nitrogen to prevent the accumulation of a lethal concentration of organic acids and produce a yield of solvents of at least 25 percent of the total sugars present.

31. The process for producing a high yield of alcohols and acetone from molasses deficient in nitrogen by fermentation with *Clostridium acetobutylicum* which comprises preparing a sterile starter mash and adding thereto substantially oil free protein capable of being acted upon by said bacilli to provide available nitrogen and to form buffer nitrogen in the final mash in an amount sufficient to provide the required available nitrogen and buffer nitrogen for the fermentation from the total nitrogenous matter present in said final mash, inoculating the starter mash with said bacilli, allowing said starter mash to ferment until said bacilli are at or near their highest possible concentration per unit of volume, sterilizing a strong molasses mash containing more than 5 percent of sugars for such a time and at such a temperature that sufficient caramelization will not develop to prevent an effective fermentation, combining said second mash with at least an equal volume of said vigorously fermenting starter mash to make a final mash in which a total of about 5 percent or more of sugars has been used, based on the original sugar content of the starter and strong mashes, and allowing the combined mashes to ferment vigorously to produce a high yield of alcohols and acetone.

32. The steps in the method of producing an effective alcohol and acetone fermentation by *Clostridium acetobutylicum* of a strong sugar mash and a starter mash the combined content of sugar present in said starter mash before inoculation and in said strong sugar mash being sufficient to prevent effective fermentation by said bacillus if added in small number, which comprises sterilizing said strong sugar mash for such a time and at such a temperature that sufficient toxicity will not develop to prevent an effective fermentation, and gradually adding the sterilized sugar mash to a vigorously fermenting starter mash containing said bacillus at such a rate as to cause bacterial mass attack and bring about effective fermentation of the sugar final mash.

33. A starter for inoculating with *Clostridium acetobutylicum* a strong molasses mash to produce a final mash, the combined sugar content of said starter before inoculation and said strong molasses mash being more than 5 percent, which comprises a vigorously fermenting solution of said molasses and *Clostridium acetobutylicum* containing less than 3 percent of sugars and an amount of buffer and available nitrogen about equal to that in an equivalent fermenting solution of corn meal, said bacilli being at or near their highest concentration.

34. A starter for inoculating with *Clostridium acetobutylicum* a strong molasses mash to produce a final mash, the combined sugar content of said starter before inoculation and said strong molasses mash being more than 5 percent, which comprises a vigorously fermenting solution of molasses and *Clostridium acetobutylicum* containing less than 3 percent of sugars and an amount of substantially oil free buffer and available nitrogen about equal to that in an equivalent fermenting solution of corn meal, said bacilli being at or near their highest concentration.

In testimony whereof I affix my signature.

JAN AUGUSTO VILJOEN.

CERTIFICATE OF CORRECTION.

Patent No. 1,911,411.                                                        May 30, 1933.

JAN AUGUSTO VILJOEN.

It is hereby certified that error appears in the printed specification of the above numbered patent requiring correction as follows: Page 2, line 54, after "pH" insert the word "value"; page 3, line 17, strike out the word "final" and insert the same before "fermentation" in line 19; page 4, line 79, for "giving" read "having"; page 6, line 1, for "sterilized" read "sterile"; line 35, claim 2, for "for" read "by", and line 46, for "containings" read "containing"; page 7, line 42, claim 7, after "said" insert the word "second"; page 8, line 66, claim 18, for "inocualtion" read "inoculation"; and line 92, claim 19, after "said" insert "molasses"; and line 126, claim 21, after "sufficient" insert the word "to"; and that the said Letters Patent should be read with these corrections therein that the same may conform to the record of the case in the Patent Office.

Signed and sealed this 15th day of August, A. D. 1933.

M. J. Moore.

(Seal)                                        Acting Commissioner of Patents.